Sept. 22, 1953    E. H. COOKE-YARBOROUGH    2,653,231
AMPLITUDE-DISCRIMINATING CIRCUITS
Filed Oct. 13, 1948    3 Sheets-Sheet 1

EDMUND HARRY COOKE-YARBOROUGH    Inventor
By
Robert B. Carson, Attorney

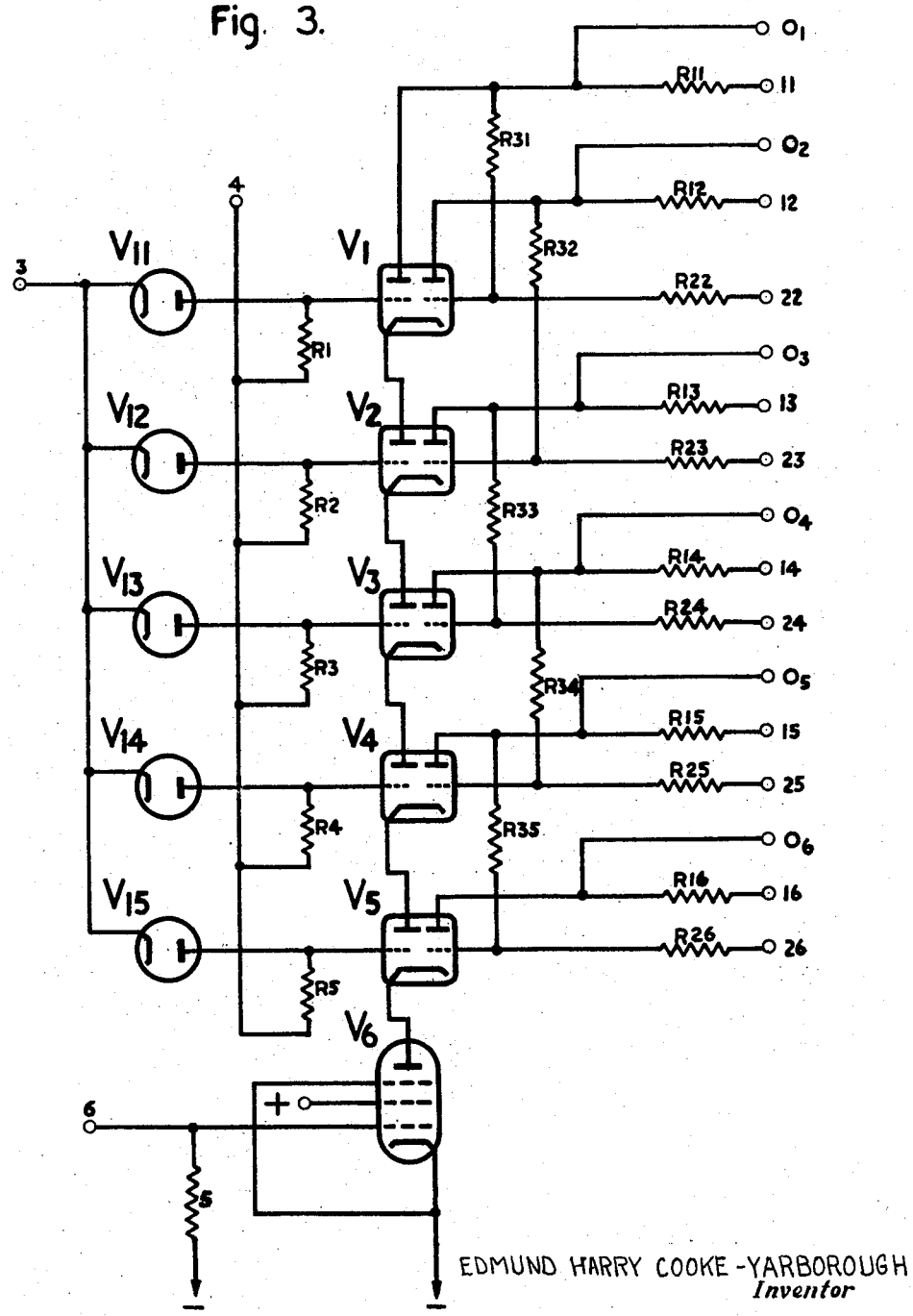

Sept. 22, 1953  E. H. COOKE-YARBOROUGH  2,653,231
AMPLITUDE-DISCRIMINATING CIRCUITS
Filed Oct. 13, 1948  3 Sheets-Sheet 3
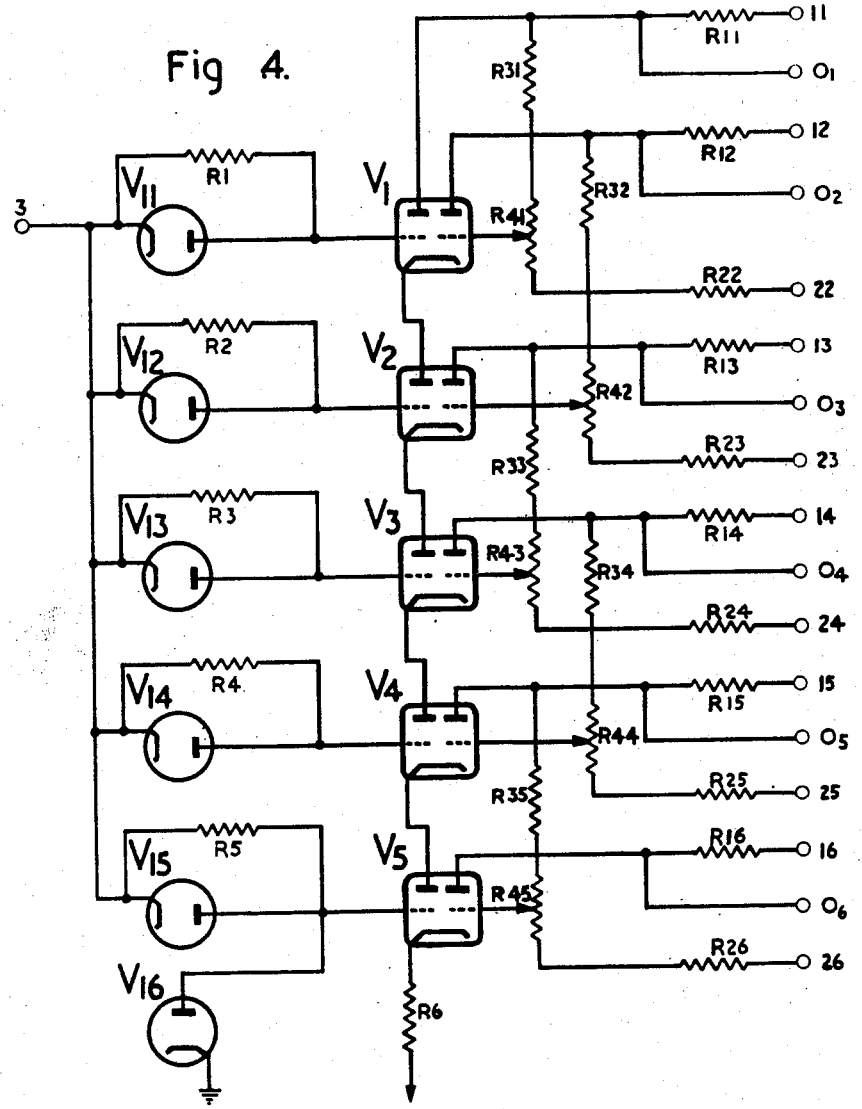
EDMUND HARRY COOKE-YARBOROUGH Inventor
By
Attorney Patented Sept. 22, 1953

2,653,231

UNITED STATES PATENT OFFICE 2,653,231

AMPLITUDE-DISCRIMINATING CIRCUITS

Edmund H. Cooke-Yarborough, London, England, assignor, by mesne assignments, to National Research Development Corporation, London, England, a corporation of Great Britain Application October 13, 1948, Serial No. 54,303
In Great Britain October 13, 1947

7 Claims. (Cl. 250—27)

This invention relates to distributing circuits for routing signals into different channels.

The invention is more particularly concerned with amplitude discriminating circuits for selecting output channels according to applied pulse amplitudes. Such circuits may be employed for classifying electrical pulses by reference to their amplitudes and the invention will be described with particular reference to this objective. Since, however, the amplitude discriminating circuits of the invention provide for the controlled selection of signal-transmitting channels, they have a variety of other uses.

A general object of the invention is to provide an improved distributing circuit suitable for operation where speed and accuracy are important.

It is a common requirement in the field of nuclear physics to sort pulses from an ionisation chamber or like device by reference to their peak amplitudes, and to cause each pulse to operate a counter appropriate to a limited amplitude range in which the pulse amplitude lies. In this application of amplitude-discriminating circuits, a high speed of operation combined with high statistical accuracy is demanded.

A more limited object of this invention is to provide amplitude-discriminating apparatus suitable for use in the analysis of pulses derived from nuclear particles.

The features of the invention are set out in the appended claims.

Figure 1:
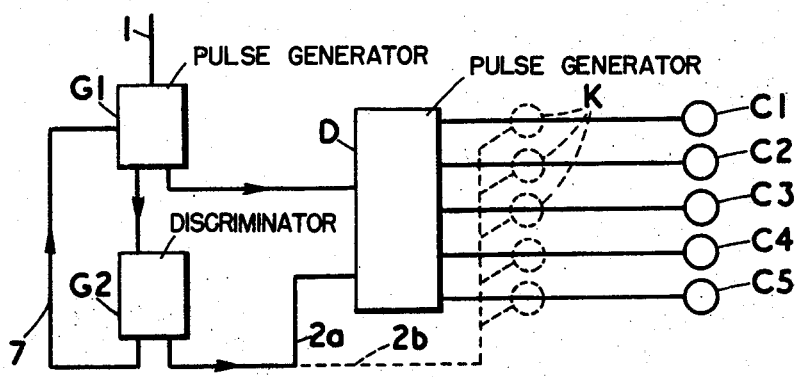
Figure 2:
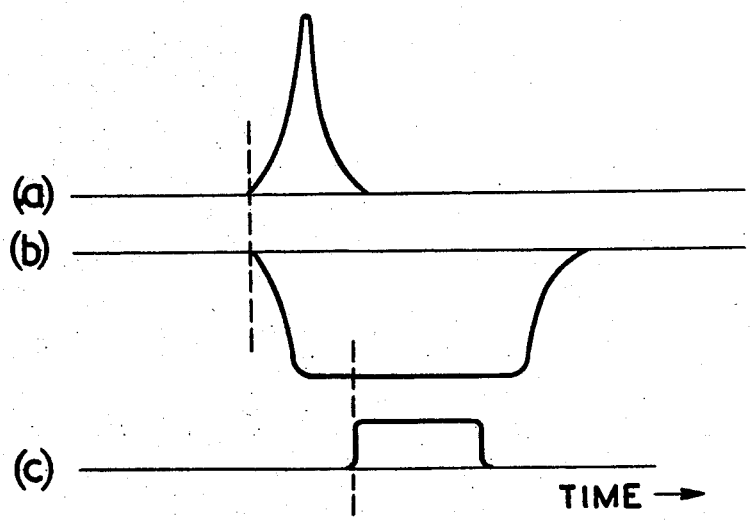

Embodiments of the invention will now be described with reference to the accompanying drawings in which Fig. 1 is a block diagram of a pulse sorting and counting system; Fig. 2 shows initial and derived pulse wave-forms in the system of Fig. 1; and Figs. 3 and 4 show alternative discriminating circuits employed in the system of Fig. 1 like parts of these two circuits bearing the same references.

In general (and especially in the analysis of pulses due to nuclear particles) the pulses to be handled are of the form shown in Fig. 2(a): that is to say, the peak amplitude persists for a very short time only. Accordingly, in such cases, a pulse of the form shown in Fig. 2(b) is derived and forms the input for the discriminator, the derived pulse having an extended flat top at a level equal to the peak amplitude of the original pulse; a switching pulse of the kind shown in Fig. 2(c), which is approximately rectangular and lasts for a time during which the Fig. 2(b) pulse is of constant amplitude, is also derived, and is employed to ensure that the discriminator takes account of the peak amplitude only of the applied pulse.

Referring to Fig. 1, the initial pulses of the form shown in Fig. 2(a) are applied through a connection 1 to a pulse generator $G_1$ of the kind in which a condenser is charged to a potential proportional to the input pulse amplitude and discharged by an electronic relay subject to a discharging pulse.

The derived flat pulse of the form shown in Fig. 2(b) is applied to a discriminating circuit D to prepare one of a number of electrical counting circuits $C_1$—$C_5$ dependent on the pulse amplitude. The derived flat pulse is also applied to a switching pulse generator $G_2$ which develops relatively uniform rectangular pulses of the form shown in Fig. 2(c) each falling within the duration of the applied pulse. These uniform switching pulses are applied either by connection 2a to the discriminator D to condition it to pass a pulse to the prepared counting circuit, or by the connection 2b to gate circuits K in all the counting circuits to condition all of them and so to cause the transmission of a pulse to the selectively prepared one. In the latter case, and where electronic counters are employed, the gate circuit may conveniently be established by providing a blocking bias for the first electronic valve of the counter and applying the switching pulse to overcome the blocking bias, such gate circuits being well-known in the art.

It is also convenient to utilise the switching pulse generator $G_2$ to develop the discharging pulse required by generator $G_1$. As shown in Fig. 1, the discharging pulse is fed back to $G_1$ by connection 7.

As will be more fully described in connection with Fig. 4, the duration of the flat pulse from $G_1$ and the timing of the switching pulse from $G_2$ need to be chosen to ensure correct discriminator action. In a variant of the system of Fig. 1, the input to the switching pulse generator $G_2$ is taken not directly from the pulse generator $G_1$ but from the discriminator output channel of smallest amplitude range (that is, terminal $O_1$ in Fig. 4). Then the switching pulse is initiated automatically when the appropriate discriminator output channel has been prepared, and the flat pulse is terminated only when the discriminator has returned to its initial condition.

The discriminator circuit of Fig. 3 is applicable in the system of Fig. 1 when the switching pulse is applied directly by connection 2a. The discriminator circuit of Fig. 4 is applicable in the system of Fig. 1 when the switching pulse is applied to the output channels by connection 2b.

Referring to Fig. 3; five double-triode, common cathode valves $V_1$—$V_5$ and a pentode $V_6$ are inter-connected as shown. The grid of each left-hand triode is connected through a diode ($V_{11}$—$V_{15}$) to input terminal 3, and each diode anode is connected through a resistance ($R_1$—$R_5$) to a terminal 4 which is held at a fixed positive potential of, say, +300 volts. (It will be assumed that the driving pulse is in the form shown in Fig. 2(b) and that when it arrives, terminal 3 is driven from a potential of +300 volts towards earth potential.)

The control grid of $V_6$ is negatively biased through resistance 5 so that there is no current in $V_6$ unless a positive-going switching pulse is present on terminal 6. The switching pulse is the pulse of Fig. 2(c), and it will be clear that no anode current flows in the pentode until the switching pulse begins.

The two anodes of $V_1$ and the right-hand anodes of $V_2$—$V_5$ are connected respectively through load resistances $R_{11}$—$R_{16}$ to terminals 11—16 which are held at suitable positive potentials, and are also connected respectively to output terminals $O_1$—$O_6$. The right-hand grids of $V_1$—$V_5$ are connected respectively through resistances $R_{22}$—$R_{26}$ to terminals 22—26 which are held at negative potentials, and five coupling resistances $R_{31}$—$R_{35}$ are provided as shown. It will be observed that the right-hand grid of each of $V_1$—$V_5$ is connected to a point in a potential divider connected between a positive and a negative supply terminal; for example, the right-hand grid of $V_3$ is joined to a point in the potential divider formed by $R_{13}$, $R_{33}$ and $R_{24}$ between positive terminal 13 and negative terminal 24. By suitable choice of resistance values and supply potentials, it is arranged that the reference potentials of the right-hand grids of $V_1$—$V_5$ are all different from one another, say +250, +200, +150, +100 and +50 volts respectively.

Before an input pulse is applied, there is no anode current flowing in $V_6$, and the cathodes of $V_1$—$V_5$ are all held at +300 volts due to grid-current charging of the stray capacities to earth associated with these cathodes. Moreover, it will be apparent that in this condition, if all the cathodes were not at +300 volts, the left-hand halves of one or more of the valves $V_1$—$V_5$ would pass anode current until the cathode voltages reached +300 volts. When the input pulse (Fig. 2(b)) begins to reduce the potential on terminal 3, the potentials of the left-hand grids of $V_1$—$V_5$ fall in sympathy; and in turn, beginning with $V_1$, the left-hand grid potentials fall below the potentials of the right-hand grids. It will be convenient for explanatory purposes to consider a specific example; suppose, therefore, that the input pulse peak amplitude is 175 volts (so that terminal 3 falls to +125 volts). In these circumstances, all the left-hand grids will be at +125 volts when the switching pulse begins, which is to say that $V_1$, $V_2$ and $V_3$ left-hand grids will have potentials lower than those of their right-hand grids, whereas $V_4$ and $V_5$ will have higher potentials on their left-hand grids than on the right-hand ones.

When the switching pulse allows anode current to flow in $V_6$, the cathode stray capacities of $V_1$—$V_5$ are discharged by $V_1$—$V_5$ taking anode current, and it will be clear that in the example chosen, current will flow to the left-hand anodes in $V_4$ and $V_5$, but to the right-hand anode in $V_3$; that is to say, an output pulse will appear at $O_4$, but not at $O_5$ and $O_6$, and since the left-hand half of $V_3$ is passing no current, there can be no current in either half of $V_1$ and $V_2$, so that no output pulses appear at $O_1$, $O_2$ and $O_3$. The output pulse at $O_4$ lasts as long as the switching pulse, and when the input pulse ends, the circuit reverts to the original conditions described above, the cathode stray capacities re-charging to +300 volts.

Each of terminals $O_1$—$O_6$ feeds a separate counting circuit as will be clear from the foregoing description of the system of Fig. 1. Clearly, in the example chosen, only the counter associated with $O_4$ makes a count, and in fact, whatever the input pulse amplitude, only that counter associated with the one output terminal at which an output pulse appears is operated.

The resistances $R_{31}$—$R_{35}$ serve not only to help in determining the right-hand grid potentials, but also provide positive feedback to ensure that current is either fully on or fully off in the left-hand sides of $V_1$—$V_5$; that is to say, the feedback couplings ensure a rapid changeover of current from the left-hand side to the right-hand side of each of valves $V_1$—$V_5$.

In the arrangement of Fig. 4 a resistance $R_6$ takes the place of $V_6$ of Fig. 3, $R_6$ having a high value (some 150,000 ohms) and being returned to a point at a negative relative to earth; the potential dividers $R_{41}$—$R_{45}$ which are connected as shown in the positive feedback couplings, made it possible to adjust individually the right-hand grid voltages of $V_1$—$V_5$, and these grids are given potentials of +250, +200, +150, +100 and +50 volts reading from $V_1$ downwards; the terminal 3 has, as before, a datum potential of +300 volts, and has negative-going input pulses of the form shown in Fig. 2(b) applied to it.

Each input pulse causes input terminal 3 to fall in potential on the leading edge, maintain a steady potential during the flat portion and rise in potential on the trailing edge. As the potential falls from 300 to 250 volts or rises from 250 to 300 volts, the conductive path from $R_6$ through valves $V_5$, $V_4$, etc., is to output $O_1$. When the potential falls from 250 to 200 volts or rises from 200 to 250 volts, the conductive path is made to output $O_2$ and so on. When the steady potential of the flat portion of the input pulse is reached, a conductive path is made to one input depending upon the size of the input pulse and a steady output potential exists in that output. A switching pulse (Fig. 2c) within the duration of the flat portion of the input pulse then opens all the gate circuits (circuits K of Fig. 1) to associate the outputs $O_1$, $O_2$, etc., with their respective counters. The only counter to operate, however, is the one associated with the output carrying the steady output potential. Output potentials in other outputs which are set up by the leading and trailing edges of the input pulse do not operate their counters as these potentials only exist at a time when the gates are closed.

From the foregoing description of Figs. 3 and 4 it will be seen that each of the valves $V_1$—$V_5$ constitutes a relay biassed to make one electrical path to the left-hand anode and excitable to make an alternative electrical path to the right-hand anode the effective bias being the difference between the standing voltages on the two grids. The paths through all the relays in their unexcited condition form a common series circuit, and from this series circuit branch a plurality of output circuits each comprising one of the alternative electrical paths to the right-hand anodes. When an incoming pulse reaches the chain of relays over the common exciting circuit, one of the relays, determined by the relation between effective bias and pulse amplitude, is effective to break the common series circuit (thereby disabling relays higher in the chain) and to complete or prepare for completion the associated output circuit.

Although the valves $V_1$—$V_5$ are shown as double triodes with common cathodes, twin electrode structures in separate envelopes or in a common envelope may be used as is well understood in the art. Each valve with its inter-connections forms electrically a coupled pair of electronic valves arranged for alternative discharge.

The valve $V_6$ in Fig. 3 with its exciting circuit constitutes a signal source connected in a common part of all of the output circuits, and determines the timing and duration of the pulse in the output circuit selected by the discriminator. The discriminator thus serves as a distributor of the signals developed by the valve $V_6$, although in the pulse analyser specifically described it is merely the existence of the signal pulses and not any particular characteristic of them which is of significance. In the pulse analyser, the signal pulses are in fact switching pulses for conditioning the output circuits or channels for relatively short periods within the durations of the pulses applied to the valve relays to select particular output circuits or channels.

Thus analysis of a pulse series is effected by deriving (a) a train of relatively flat pulses of proportional amplitude and (b) a train of relatively uniform pulses each falling within the duration of the corresponding flat pulse, utilising the flat pulses to select output channels according to pulse amplitude and utilising the uniform pulses to determine the timing and duration of pulses transmitted through said channels.

I claim:

1. A distributing circuit comprising a plurality of electrically controlled switches each biassed to make one electrical circuit path and excitable to make an alternative electrical circuit path, a common series circuit comprising the electrical circuit paths of said switches in their biassed condition, and a plurality of output circuits each branching from the common series circuit through one of said alternative electrical circuit paths, means providing a progressively different bias on each of said switches along the common series circuit, and a common exciting circuit for all said switches whereby, dependent upon the amplitude of the excitation in relation to the bias, one or other of said switches is effective to break the common series circuit and to complete its associated output circuit.

2. A distributing circuit according to claim 1 wherein each said electrically controlled switch comprises a pair of electronic valves cathode coupled for alternative discharge dependent on their relative grid bias voltages.

3. A distributing circuit according to claim 1 including a signal source connected in said common series circuit at an end thereof for the distribution of signals among said output circuits.

4. A pulse analyser for counting pulses in a plurality of different amplitude ranges comprising a distributing circuit according to claim 1, means for applying pulses of different amplitudes to the exciting circuit for said electrically controlled switches and a plurality of counters, one each of said counters being operatively associated with a respective output circuit.

5. A pulse analyser, according to claim 4, including means operated by switching pulses for conditioning the output circuits for relatively short periods within the durations of the pulses applied to said exciting circuit.

6. A pulse analyser for classifying electrical pulses according to their amplitude comprising means for deriving relatively flat pulses having extended portions of continuous amplitudes proportional to the peak amplitudes of the original pulses, means for deriving relatively uniform pulses each falling within the continuous amplitude portion of the corresponding flat pulse, a distributing circuit adapted to be energized and having a plurality of output channels, connections for applying the flat pulses to said distributing circuit when energized to select output channels in succession according to the amplitudes of the successive flat pulses, and means for applying the uniform pulses to control said output channels to cause said channels to be energized only for the duration of each uniform pulse.

7. A pulse analyser for counting pulses in a plurality of different amplitude ranges, comprising a distributing circuit according to claim 1, means for applying pulses of different amplitudes to the exciting circuit for said electrically controlled switch and a plurality of counters one each of said counters being operatively associated with a respective output circuit, and means for deriving relatively flat-topped pulses from initial pulses to be counted, said flat-topped pulses having amplitudes proportional to the amplitudes of the initial pulses, and means connecting said driving means to said means for applying pulses to said exciting circuit.

EDMUND H. COOKE-YARBOROUGH.

References Cited in the file of this patent

UNITED STATES PATENTS

| Number | Name | Date |
|---|---|---|
| 2,403,527 | Hershberger | July 9, 1946 |
| 2,408,063 | Grieg | Sept. 24, 1946 |
| 2,416,330 | Labin | Feb. 25, 1947 |
| 2,419,340 | Easton | Apr. 22, 1947 |
| 2,443,198 | Sallach | June 15, 1948 |
| 2,447,233 | Chatterjea et al. | Aug. 17, 1948 |
| 2,498,678 | Grieg | Feb. 28, 1950 |